US012651592B2

(12) United States Patent
Ohayon

(10) Patent No.: US 12,651,592 B2
(45) Date of Patent: Jun. 9, 2026

(54) SYSTEM, METHOD, AND COMPUTER PROGRAM FOR REAL-TIME LANGUAGE TRANSLATION USING GENERATIVE ARTIFICIAL INTELLIGENCE

(71) Applicant: Amdocs Development Limited, Limassol (CY)

(72) Inventor: Jean-marc Eric Ohayon, Givat Shmuel (IL)

(73) Assignee: AMDOCS DEVELOPMENT LIMITED, Limassol (CY)

(*) Notice: Subject to any disclaimer, the term of this patent is extended or adjusted under 35 U.S.C. 154(b) by 320 days.

(21) Appl. No.: 18/199,270

(22) Filed: May 18, 2023

(65) Prior Publication Data

US 2024/0386879 A1 Nov. 21, 2024

(51) Int. Cl.
| | |
|---|---|
| *G10L 13/08* | (2013.01) |
| *G10L 15/00* | (2013.01) |
| *G10L 15/01* | (2013.01) |
| *G10L 15/16* | (2006.01) |

(52) U.S. Cl.
CPC .......... *G10L 13/086* (2013.01); *G10L 15/005* (2013.01); *G10L 15/01* (2013.01); *G10L 15/16* (2013.01)

(58) Field of Classification Search
None
See application file for complete search history.

(56) References Cited

U.S. PATENT DOCUMENTS

| | | | | |
|---|---|---|---|---|
| 12,079,587 B1 * | 9/2024 | Radford | ................... | G06F 40/58 |
| 12,277,927 B2 * | 4/2025 | Li | ............................ | G06F 40/44 |
| 2020/0044999 A1 * | 2/2020 | Wu | ......................... | H04L 51/02 |
| 2020/0184158 A1 * | 6/2020 | Kuczmarski | .......... | G06N 20/00 |
| 2021/0390268 A1 * | 12/2021 | Pandey | .................. | G06N 5/025 |
| 2022/0147721 A1 * | 5/2022 | Galle | ...................... | G06N 3/08 |
| 2023/0267285 A1 * | 8/2023 | Wu | ........................ | G06F 40/166 |
| | | | | 704/2 |
| 2023/0342561 A1 * | 10/2023 | Zhang | ..................... | G06F 40/44 |

OTHER PUBLICATIONS

International Search Report and Written Opinion from PCT Application No. PCT/IB2024/054578, dated Aug. 20, 2024, 11 pages.
Dabre et al., "A Survey of Multilingual Neural Machine Translation," ACM Computing Surveys, vol. 53, Sep. 2020, pp. 1-38.
Zhang et al., "Neural Machine Translation: Challenges, Progress and Future," arXiv, Apr. 2020, 22 pages, retrieved from https://arxiv.org/pdf/2004.05809.

(Continued)

*Primary Examiner* — Daniel C Washburn
*Assistant Examiner* — Tyler Becker
(74) *Attorney, Agent, or Firm* — Zilka-Kotab, P.C.

(57) ABSTRACT

As described herein, a system, method, and computer program provide real-time language translation using generative artificial intelligence. An input in a first spoken language is received. The input in the first spoken language is processed, using a generative artificial intelligence model, to generate a translation of the input in a second spoken language. The translation is output.

16 Claims, 6 Drawing Sheets

200

INPUT INTERFACE
202

REAL-TIME LANGUAGE TRANSLATION SERVICE
204

GENERATIVE ARTIFICIAL INTELLIGENCE MODEL
206

(56) References Cited

OTHER PUBLICATIONS

Latif et al., "Transformers in Speech Processing: A Survey," arXiv, 2023, 27 pages, retrieved from https://arxiv.org/pdf/2303.11607.

Yuan et al., "A Roadmap for Big Model," arXiv, 2022, 200 pages, retrieved from https://arxiv.org/pdf/2203.14101v1.

Inaguma et al., "Multilingual End-to-End Speech Translation," Â IEEE Automatic Speech Recognition and Understanding Workshop (ASRU), 2019, pp. 570-577.

Sulubacak et al., "Multimodal Machine Translation through Visuals and Speech," arXiv, 2019, 34 pages, retrived from https://arxiv.org/abs/1911.12798.

* cited by examiner

100

102 — receive an input in a first spoken language

104 — process the input in the first spoken language, using a generative artificial intelligence model, to generate a translation of the input in a second spoken language 106 — output the translation in the second spoken language

200

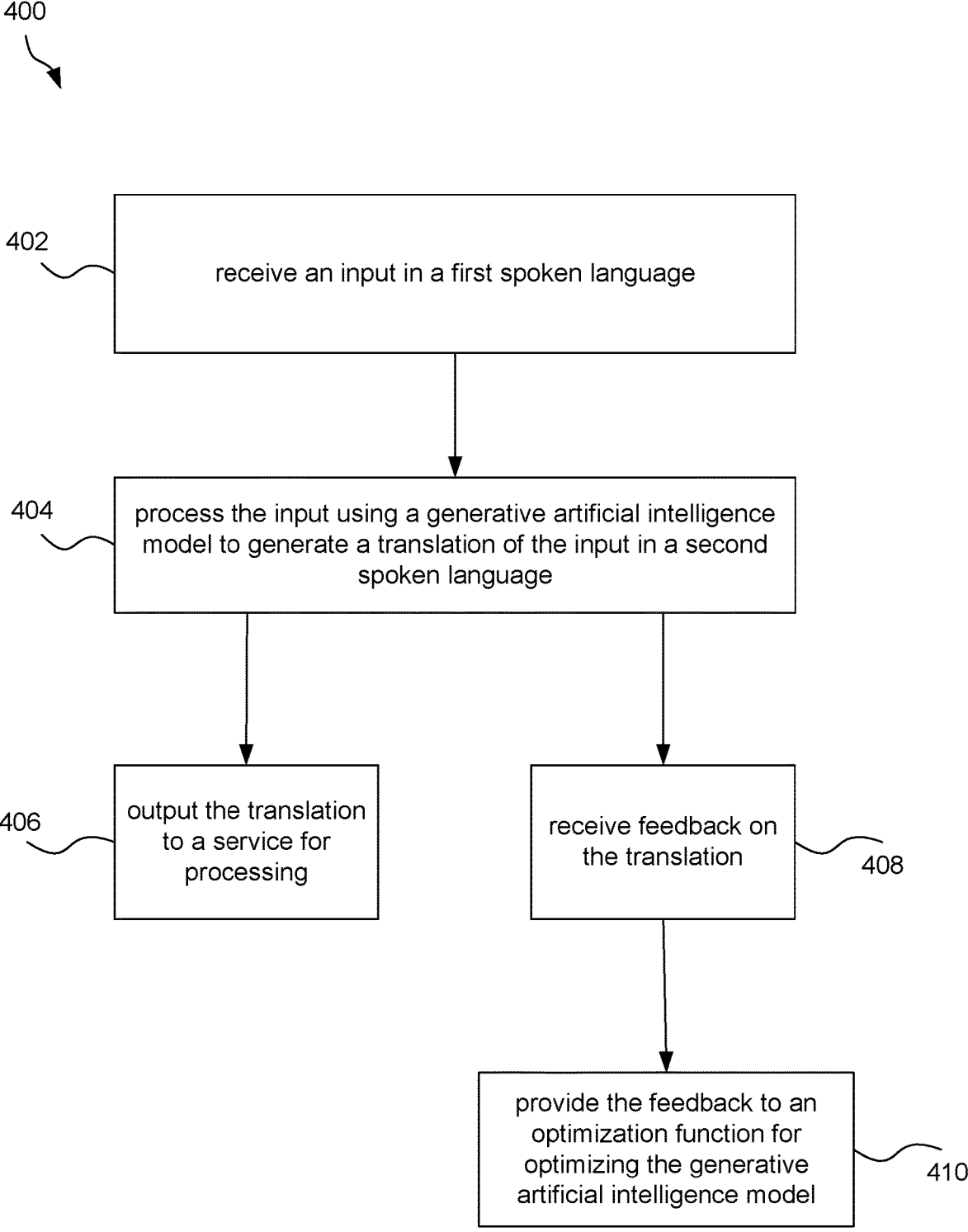

400

402 — receive an input in a first spoken language

404 — process the input using a generative artificial intelligence model to generate a translation of the input in a second spoken language 406 — output the translation to a service for processing receive feedback on the translation — 408 provide the feedback to an optimization function for optimizing the generative artificial intelligence model — 410

SERVER

504

TELEVISION

512

508

PDA

NETWORK(S)

502

506

COMPUTER

510

MOBILE
TELEPHONE

SYSTEM, METHOD, AND COMPUTER PROGRAM FOR REAL-TIME LANGUAGE TRANSLATION USING GENERATIVE ARTIFICIAL INTELLIGENCE

FIELD OF THE INVENTION

The present invention relates to language translation services.

BACKGROUND

Language differences can cause communication barriers that can be costly and inefficient for businesses. These language differences can arise within a business operating across different countries. These language differences can also arise between a business and its customers.

To date language differences have not been easily resolved. For example, many languages have complex grammatical structures and nuances that can be difficult for nonnative speakers to master. Additionally, machine translation is not perfect, and errors can still occur.

There is thus a need for addressing these and/or other issues associated with the prior art. For example, there is a need for real-time language translation using generative artificial intelligence. Providing real-time language translation services using generative artificial intelligence can help provide accurate and natural-sounding translations that capture the nuances of the original language, and can allow for continuous improvement over time to reduce the frequency of errors and improve the accuracy. By breaking down language barriers with real-time language translation using generative artificial intelligence, a business may be able to communicate more efficiently, reduce misunderstandings, and improve productivity, which in turn can lead to cost savings and increased revenue for the business.

SUMMARY

As described herein, a system, method, and computer program provide real-time language translation using generative artificial intelligence. An input in a first spoken language is received. The input in the first spoken language is processed, using a generative artificial intelligence model, to generate a translation of the input in a second spoken language. The translation is output.

BRIEF DESCRIPTION OF THE DRAWINGS

FIG. 4 illustrates a method for using a generative artificial intelligence model to provide a real-time language translation service, in accordance with one embodiment.

DETAILED DESCRIPTION

Figure 1:
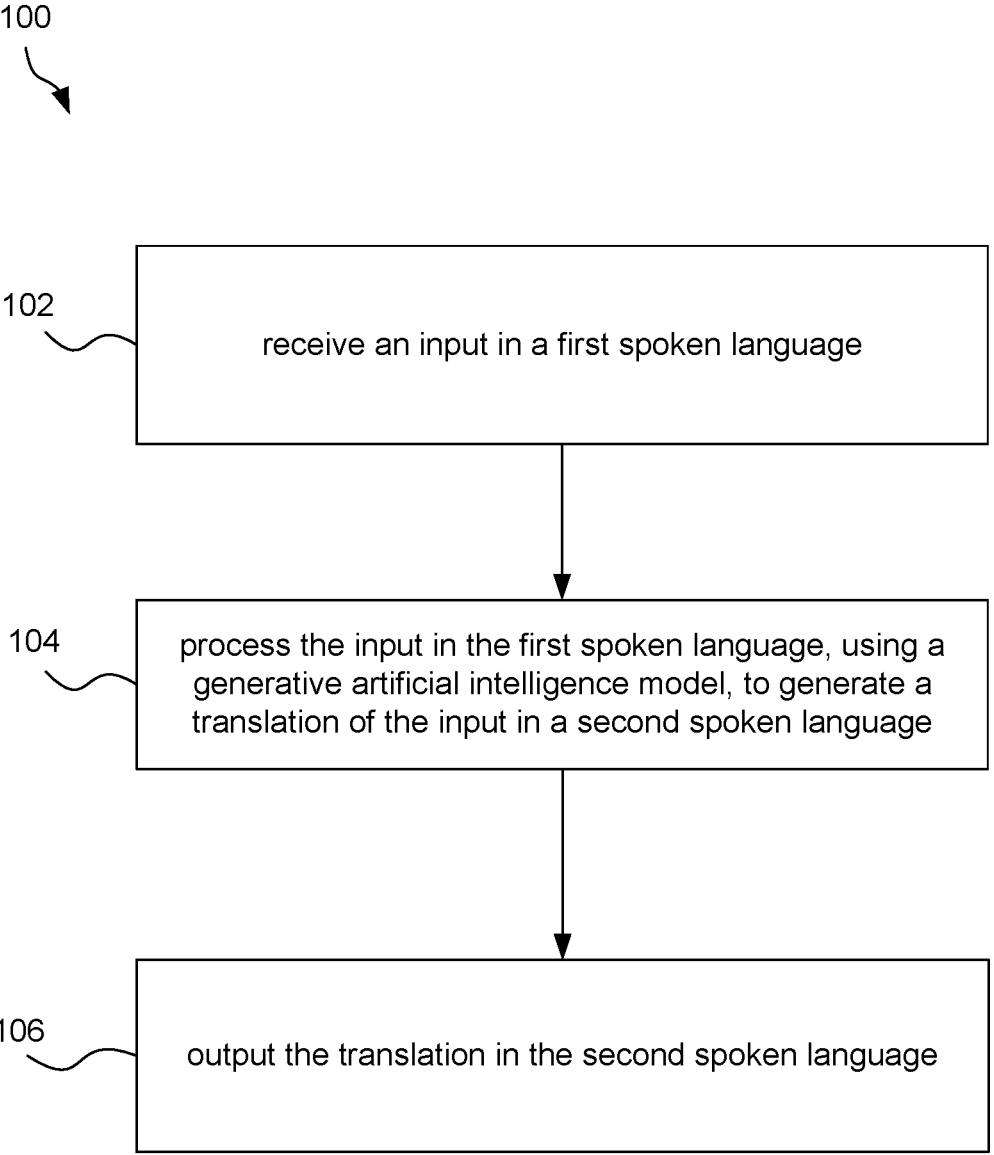
FIG. 1 illustrates a method for real-time language translation using generative artificial intelligence, in accordance with one embodiment.

FIG. 1 illustrates a method 100 for real-time language translation using generative artificial intelligence, in accordance with one embodiment. The method 100 may be carried out by a computer system, such as that described below with respect to FIGS. 5 and/or 6. In an embodiment, the computer system (e.g. system 200 of FIG. 2 below) may implement the method 100 as a real-time language translation service.

In operation 102, an input in a first spoken language is received. The first spoken language refers to any spoken language that is differentiated from a second spoken language discussed below. A spoken language refers to any existing language that is spoken by people in one or more communities. For example, a spoken language may be English, Spanish, French, Mandarin Chinese, etc. It should be noted that while the input that is received is in a spoken language, the input itself may not necessarily be in a spoken format when received, as described below.

In an embodiment, the input may be received from a manual input of a user. For example, the manual input may be provided by the user in a user interface configured to accept such manual input. In another embodiment, the input may be auto-generated by a system, such as a chatbot or other virtual communication system.

In an embodiment, the input is a spoken (i.e. verbal) input. For example, the spoken input may be audibly recorded (e.g. via the user interface mentioned above). In another embodiment, the input is a text input. For example, the text input may be manually typed by the user (e.g. into the user interface mentioned above), or may be auto-generated by the system mentioned above and then automatically provided as input.

In operation 104, the input in the first spoken language is processed, using a generative artificial intelligence model, to generate a translation of the input in a second spoken language. The translation may be generated as a spoken (i.e. verbal) translation or a text translation. The second spoken language refers to any spoken language that is differentiated from a first spoken language in which the input is received.

With respect to the present description, the generative artificial intelligence model refers to any type of artificial intelligence model that is generative, or in other words that is trained to make predictions of language translations for given input. In various examples, the generative artificial intelligence model may be a transformer model, a Long Short-Term Memory network (LSTM), a Convolutional Neural Network (CNN), an Encoder-Decoder model, or a neural machine translation (NMT) model.

As noted above, the generative artificial intelligence model is trained to generate a language translation for a given input. In this embodiment, a training data set may be generated for use in training the generative artificial intelligence model. The training data set may include multilingual text and speech data in a standardized format. the multilingual text and speech data is collected from public databases, online corpora, user generated content, etc. Further to the embodiment where the training data set is generated, the generative artificial intelligence model may then be trained using the training data set.

In operation 106, the translation is output. In an embodiment, the translation may be output as a spoken translation. In another embodiment, the translation may be output as a text translation. It should be noted that the translation may be output in a format (i.e. spoken or text) that is different from the input.

In this way, the method 100, and in particular the generative artificial intelligence model, may provide text-to-text translations, text-to-speech translations, speech-to-text translations, or speech-to-speech translations. In an embodiment, the method 100 may be performed in real-time.

As an option, the method 100 may further include testing the translation with real-world data, and then optimizing the generative artificial intelligence model based on a result of the testing. For example, the real-world data may include feedback from a user regarding the translation. In this example, the testing may include verifying whether the feedback indicates a correctness of the translation generated by the generative artificial intelligence model, or determining a degree of correctness of the translation generated by the generative artificial intelligence model. Thus, the result of the testing may indicate a correctness of the translation generated by the generative artificial intelligence model. In an embodiment, the generative artificial intelligence model may be optimized using reinforcement learning (e.g. as applied to the result of the testing).

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
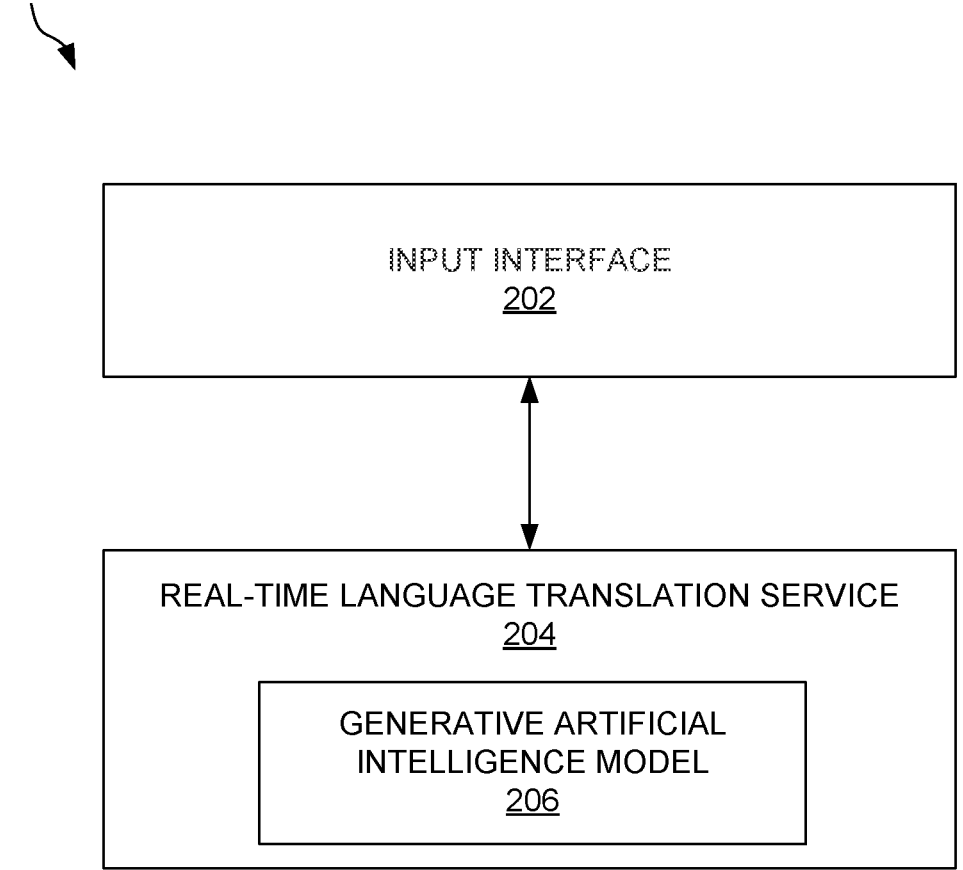
FIG. 2 illustrates a flow diagram of a system for real-time language translation using generative artificial intelligence, in accordance with one embodiment.

FIG. 2 illustrates a flow diagram of a system 200 for real-time language translation using generative artificial intelligence, in accordance with one embodiment. As an option, the system 200 may be implemented in the context of the details of the previous figure and/or any subsequent figure(s). Of course, however, the system 200 may be implemented in the context of any desired environment. Further, the aforementioned definitions may equally apply to the description below.

As shown, an input interface 202 interfaces (e.g. via an application programming interface (API), a network, etc.) a real-time language translation service 204. The input interface 202 and the real-time language translation service 204 execute on the system 200, which may be a single computer system (e.g. server) or a combination of different computer systems in communication with one another.

The input interface 202 is provided for receiving an input in a first spoken language. In an embodiment, the input interface 202 may be a user interface that includes an input element in which the user can input a verbal or text input. In an embodiment, the input element may accept user input in any spoken language.

In another embodiment, the input interface 202 may be an API that allows a process (e.g. of an application or service) to provide an input in a first spoken language. For example, the process may be a chatbot process or other virtual process that generates a spoken language input.

Upon receipt, by the input interface 202 of an input in a first spoken language, the input interface 202 provides the input to the real-time language translation service 204. As shown, the real-time language translation service 204 includes a generative artificial intelligence model 206 that has been trained to generate a translation in a second spoken language for a given input in a first spoken language. In this case, the generative artificial intelligence model 206 processes the input provided by the input interface 202, and generates a translation in a second spoken language. The second spoken language in which the input is translated may be indicated to the generative artificial intelligence model 206, for example based on an additional input provided to the real-time language translation service 204.

Figure 3:
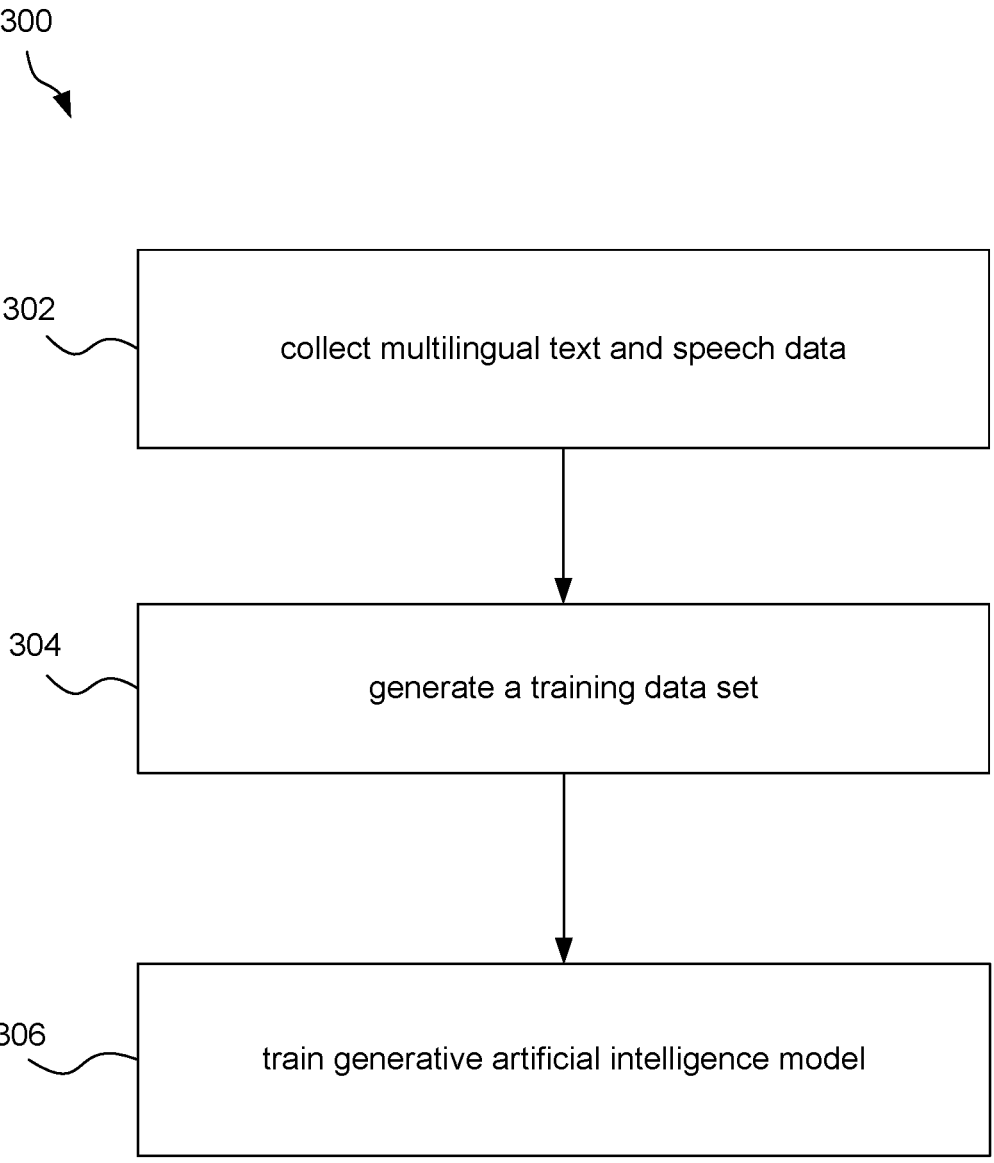
FIG. 3 illustrates a method for training a generative artificial intelligence model to provide real-time language translation, in accordance with one embodiment.

FIG. 3 illustrates a method 300 for training a generative artificial intelligence model to provide real-time language translation, in accordance with one embodiment. As an option, the method 300 may be carried out in the context of the details of the previous figure and/or any subsequent figure(s). Of course, however, the method 300 may be carried out in the context of any desired environment. Further, the aforementioned definitions may equally apply to the description below.

In operation 302, multilingual text and speech data is collected. This data may be collected from various sources, such as public databases, online corpora, and user-generated content.

In operation 304, a training data set is generated. In particular, the training data set is generated from the collected multilingual text and speech data. In an embodiment, the training data set may include the data preprocessed to a standardized format.

In operation 306, a generative artificial intelligence model is trained. Specifically, the generative artificial intelligence model is trained using the training data set. With respect to the present embodiment, the generative artificial intelligence model is trained to generate a language translation for a given input. For example, a deep learning model, such as a neural machine translation (NMT) model, may be used to train the generative artificial intelligence model. In general, NMT models use a sequence-to-sequence architecture that takes in a source language sentence and outputs a target language sentence.

The method 300 may be repeated periodically to improve a performance and accuracy of the generative artificial intelligence model, particularly based on new multilingual text and speech data collected over time. As another option, the performance and accuracy of the generative artificial intelligence model may be improved by testing language translations generated by the generative artificial intelligence model and then optimizing the generative artificial intelligence model based on a result of the testing. For example, feedback from users and machine learning techniques, such as reinforcement learning, may be used to continuously improve the generative artificial intelligence model over time.

There are multiple existing data sets that can be used to train the generative artificial intelligence model, particularly based on new multilingual text and speech data collected over model:

1. WMT: The Workshop on Machine Translation (WMT) provides a range of parallel corpora for training and evaluating machine translation systems. The WMT datasets cover many language pairs, and the most recent version, WMT2021, includes parallel data in over 100 languages.

2. IWSLT: The International Workshop on Spoken Language Translation is an annual evaluation campaign for spoken language translation systems. The IWSLT datasets include both spoken and written data and cover a range of language pairs.

3. TED Talks: Provide a valuable resource for training and evaluating machine translation systems, particularly for spoken language translation. The TED Talks dataset includes parallel transcripts and translations for a large number of talks in a variety of languages.

4. OpenSubtitles: Large parallel corpus of movie and TV subtitles. The dataset includes parallel translations in many different languages, and it is commonly used for machine translation research.

5.Europarl: Parallel corpus of transcripts of debates from the European Parliament. The dataset includes translations in 21 different languages, making it a good choice for training multilingual models.

6.MultiUN: Parallel corpus of documents from the United Nations in six different languages. The dataset includes translations of a range of document types, including reports, speeches, and resolutions.

7.Cornell Movie Dialogs Corpus: Contains a large collection of movie scripts and their corresponding dialogues in English.

There are multiple types of generative artificial intelligence models that can be trained in the present method 300.

1. Transformer: The transformer model is a neural network model that is trained on large bilingual corpora, which allows it to learn how to translate between languages. The Transformer architecture is based on the idea of self-attention, which allows the model to weigh the importance of different parts of the input sequence when generating the output.

During training, the model learns to generate a probability distribution over the target language vocabulary given the input source language sentence. The probability distribution is generated by the decoder component of the transformer model, which uses the output of the encoder component and the previous output token to generate the next output token.

The transformer model has several advantages over earlier models for machine translation, including its ability to handle long input and output sequences, its parallelism, and its ability to capture long-range dependencies. These properties make it well-suited for real-time language translation services, where speed and accuracy are critical.

2. LSTM: Long Short-Term Memory is a recurrent neural network architecture that can be used for language translation. LSTMs are designed to remember previous inputs and produce outputs based on that context, making them well-suited for language translation.

3. Convolutional Neural Networks (CNNs): More commonly used for image recognition tasks, they can also be used for natural language processing tasks, such as language translation. CNNs are particularly useful for capturing local relationships between words in a sentence.

4. Encoder-Decoder models: This type of model can be used for language translation and is based on the idea of using one neural network to encode the input sentence and another neural network to decode the output sentence. The two networks are trained together to generate translations.

FIG. 4 illustrates a method 400 for using a generative artificial intelligence model to provide a real-time language translation service, in accordance with one embodiment. As an option, the method 400 may be carried out in the context of the details of the previous figure and/or any subsequent figure(s). For example, the method 400 may use the generative artificial intelligence model trained in via method 300. Of course, however, the method 400 may be carried out in the context of any desired environment. Further, the aforementioned definitions may equally apply to the description below.

In operation 402, an input in a first spoken language is received. In operation 404, the input is processed using a generative artificial intelligence model to generate a translation of the input in a second spoken language. In operation 406, the translation is output to a service for processing. Examples of this service will be described in detail below.

In operation 408, which may be performed in parallel to operation 406 to subsequent to operation 406, feedback on the translation is received. In operation 410, the feedback is provided to an optimization function for optimizing the generative artificial intelligence model.

Use Cases/Services

Customer service: Customer service operations (e.g. of business entities such as telecommunications providers) may be integrated with the generative artificial intelligence-powered language translation service described above. This integration may provide customers with real-time language translation capabilities, improving the customer experience and reducing the need for human translators.

Content localization: Digital content management services may be integrated with the generative artificial intelligence-powered language translation service described above. This integration may automate the process of localizing content for different languages, making it easier for digital content providers to expand into new markets.

Multilingual chatbots: Chatbots that provide automated customer service may be integrated with the generative artificial intelligence-powered language translation service described above. This integration may create multilingual chatbots that can communicate with customers in their preferred language, improving the customer experience and reducing the need for human translators.

Real-time Speech-to-Speech Translation: The generative artificial intelligence-powered language translation service described above can translate spoken language between different languages. This translation service can be used for telecommunications providers that provide international calling services.

Real-time Text-to-Text Translation: The generative artificial intelligence-powered language translation service described above can translate written language between different languages. This translation service can be used for chatbots, social media platforms, and email communications.

Real-time Speech-to-Text Translation: The generative artificial intelligence-powered language translation service described above can transcribe spoken language into text and then translate it into a different language. This translation service can be used for customer service calls, webinars, and other types of audio content.

Real-time Text-to-Speech Translation: The generative artificial intelligence-powered language translation service described above can translate written language into spoken language in a different language. This translation service can be used for automated voice prompts, virtual assistants, and other types of audio content.

The generative artificial intelligence-powered language translation service described above can provide:

1. Speed and responsiveness: The generative artificial intelligence-powered language translation service described above can deliver translations in real-time, providing fast and responsive communication for businesses and individuals. This is a significant improvement over traditional translation services, which can take hours or even days to deliver translations.

2. Accuracy and quality: Advanced generative artificial intelligence models can provide highly accurate translations that capture the nuances of the original language and generate translations that are more natural-sounding and contextually appropriate. This is a significant improvement over rule-based translation systems that often produce translations that sound unnatural or contain errors.

3. Multilingual support: The generative artificial intelligence-powered language translation service described above can support multiple languages, making them more versatile and flexible than traditional translation services. This is particularly important for businesses that operate in multiple countries and need to communicate with customers, partners, and suppliers in different languages.

4. Scalability: The generative artificial intelligence-powered language translation service described above can be scaled up or down depending on the needs of the business. This makes it more adaptable to changing business needs and can help businesses save costs by avoiding the need to hire and train additional translation staff.

5. Cost-effectiveness: The generative artificial intelligence-powered language translation service described above is more cost-effective than traditional translation services, particularly for businesses that need to translate large volumes of text or speech. By reducing the need for human translators, businesses can save costs and improve their bottom line.

Implementation for Telecommunications Providers

Telecommunications providers are uniquely positioned to offer the above described real-time generative artificial intelligence-powered language translation service because they have the necessary infrastructure and expertise to deliver this service. Telecommunications providers typically have high-performance computing and network infrastructure that can support the real-time processing and delivery of translations. Additionally, many telecommunications providers already offer voice and messaging services, making language translation services a natural extension of their existing offerings.

Compared to traditional translation services, the above described real-time generative artificial intelligence-powered language translation service can help telecommunications providers differentiate themselves in a crowded and competitive market. By offering faster and more accurate translations, telecommunications providers can provide a better customer experience and improve customer satisfaction. Additionally, by supporting multiple languages, telecommunications providers can attract and retain customers who operate in multiple countries and need to communicate in different languages.

The above described real-time generative artificial intelligence-powered language translation service can also provide telecommunications providers with a new revenue stream. By charging a fee for this service, telecommunications providers can generate additional revenue and increase their average revenue per user (ARPU). Additionally, telecommunications providers can use language translation services as a way to upsell customers to higher-tier service plans that include translation services.

Overall, the above described real-time generative artificial intelligence-powered language translation service offers telecommunications providers a unique opportunity to differentiate themselves in a competitive market, improve customer satisfaction, and generate new revenue streams. By leveraging their existing infrastructure and expertise, telecommunications providers can provide a valuable service to businesses and individuals who need to communicate in different languages.

Figure 5:
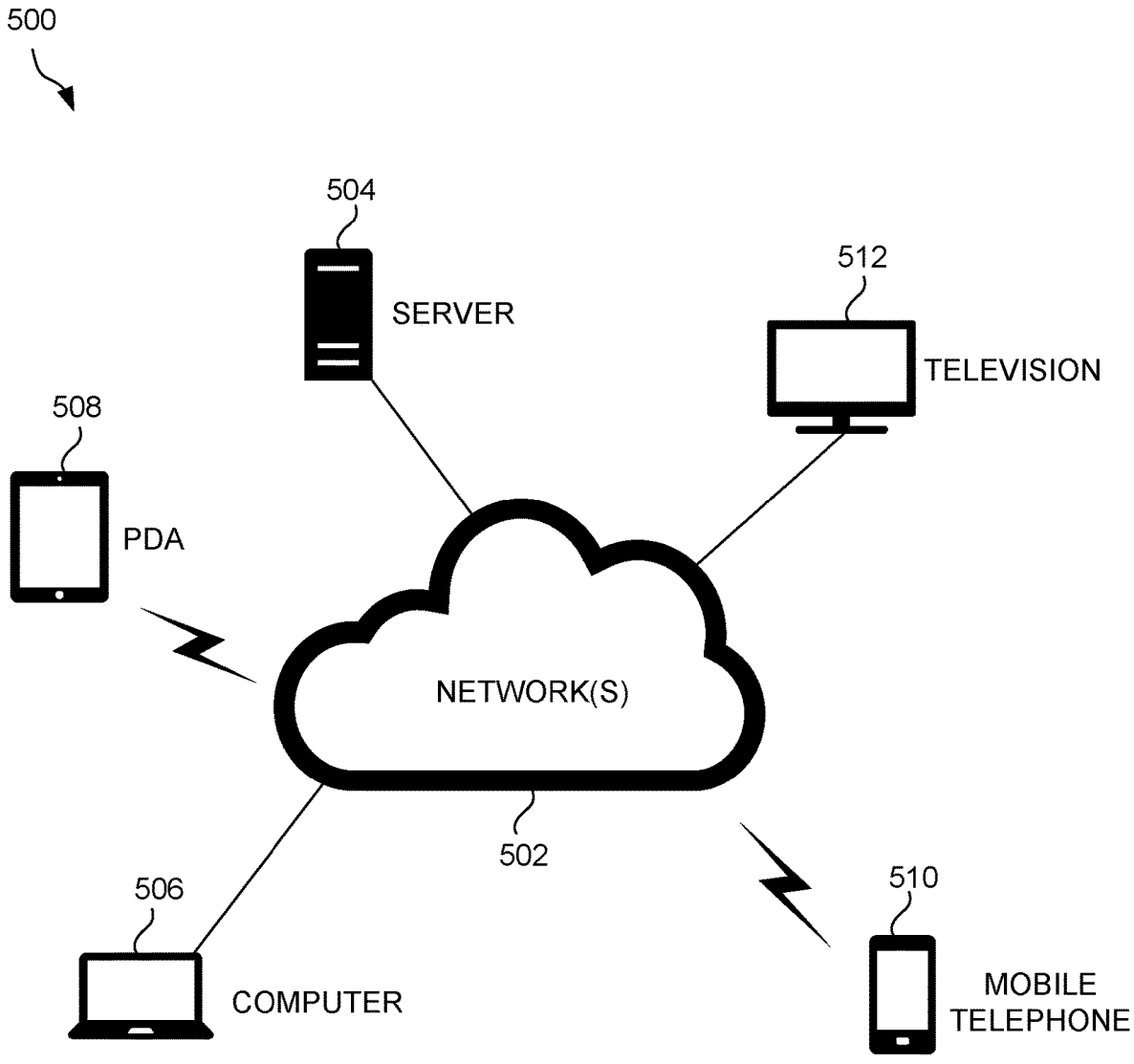
FIG. 5 illustrates a network architecture, in accordance with one possible embodiment.

FIG. 5 illustrates a network architecture 500, in accordance with one possible embodiment. As shown, at least one network 502 is provided. In the context of the present network architecture 500, the network 502 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 502 may be provided.

Coupled to the network 502 is a plurality of devices. For example, a server computer 504 and an end user computer 506 may be coupled to the network 502 for communication purposes. Such end user computer 506 may include a desktop computer, lap-top computer, and/or any other type of logic. Still yet, various other devices may be coupled to the network 502 including a personal digital assistant (PDA) device 508, a mobile phone device 510, a television 512, etc.

Figure 6:
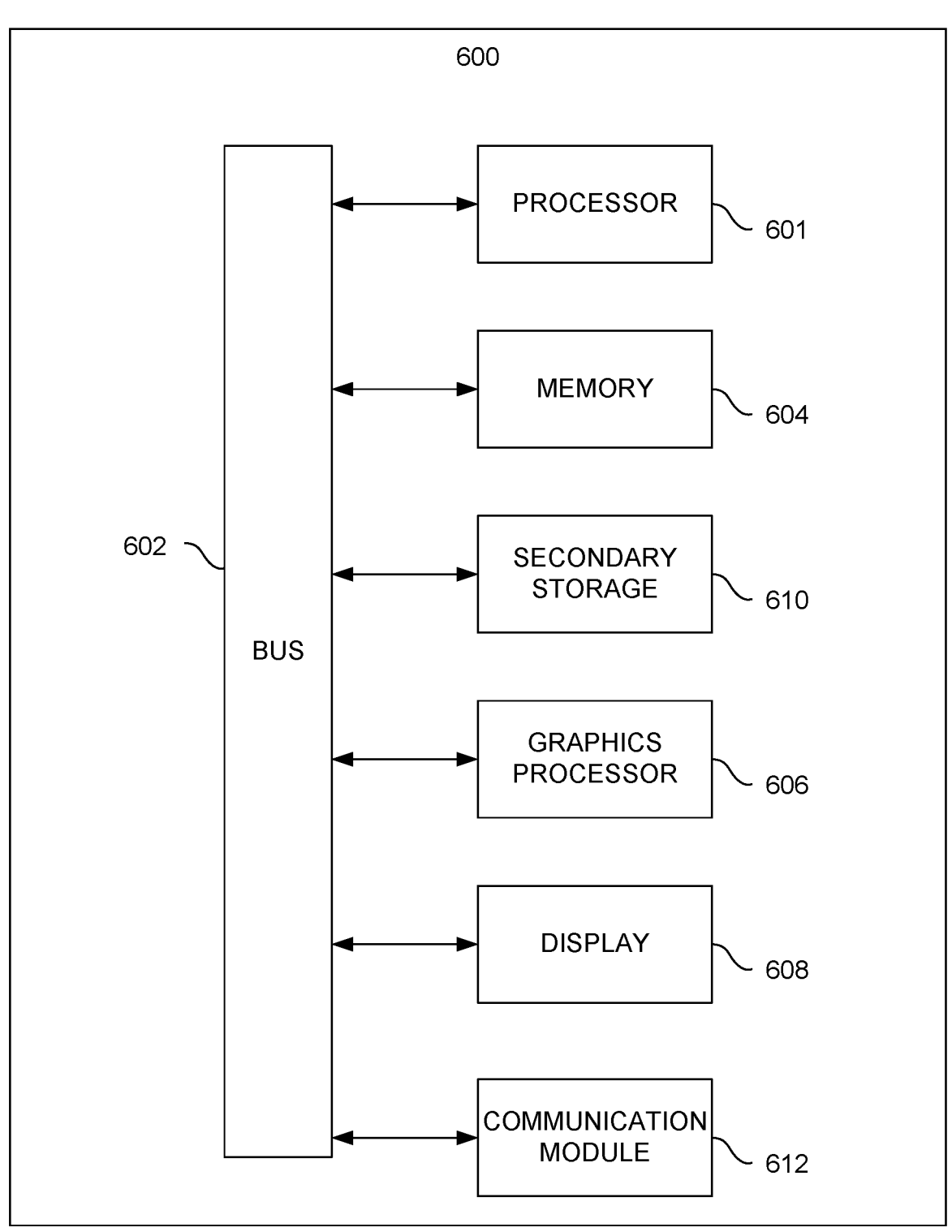
FIG. 6 illustrates an exemplary system, in accordance with one embodiment.

FIG. 6 illustrates an exemplary system 600, in accordance with one embodiment. As an option, the system 600 may be implemented in the context of any of the devices of the network architecture 500 of FIG. 5. Of course, the system 600 may be implemented in any desired environment.

As shown, a system 600 is provided including at least one central processor 601 which is connected to a communication bus 602. The system 600 also includes main memory 604 [e.g. random access memory (RAM), etc.]. The system 600 also includes a graphics processor 606 and a display 608.

The system 600 may also include a secondary storage 610. The secondary storage 610 includes, for example, solid state drive (SSD), flash memory, a removable storage drive, etc. The removable storage drive reads from and/or writes to a removable storage unit in a well-known manner.

Computer programs, or computer control logic algorithms, may be stored in the main memory 604, the secondary storage 610, and/or any other memory, for that matter. Such computer programs, when executed, enable the system 600 to perform various functions (as set forth above, for example). Memory 604, storage 610 and/or any other storage are possible examples of non-transitory computer-readable media.

The system 600 may also include one or more communication modules 612. The communication module 612 may be operable to facilitate communication between the system 600 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer-readable media storing computer instructions which when executed by one or more processors of a device cause the device to:
   receive, via an application programming interface (API) enabling communications between an application and a language translation service, an input that includes:
      audio of a speech that has been generated in a first spoken language by a chatbot process of the application, and
      an indication of a second spoken language to which the speech is to be translated;
   process the input, using a generative artificial intelligence model of the language translation service, to generate in real time a translation of the speech in the second spoken language; and
   output, by the language translation service to the application, an audio of the translation in the second spoken language to cause the chatbot process to operate as a multilingual chatbot that communicates in real time with a customer in the second spoken language.

2. The non-transitory computer-readable media of claim 1, wherein the device is further caused to:
   generate a training data set for use in training the generative artificial intelligence model.

3. The non-transitory computer-readable media of claim 2, wherein the training data set includes multilingual text and speech data in a standardized format.

4. The non-transitory computer-readable media of claim 3, wherein the multilingual text and speech data is collected from at least one of:
   public databases,
   online corpora, or
   user generated content.

5. The non-transitory computer-readable media of claim 2, wherein the device is further caused to:

train the generative artificial intelligence model using the training data set.

6. The non-transitory computer-readable media of claim 1, wherein the generative artificial intelligence model is a transformer model.

7. The non-transitory computer-readable media of claim 6, wherein the generative artificial intelligence model is a Long Short-Term Memory network (LSTM).

8. The non-transitory computer-readable media of claim 1, wherein the generative artificial intelligence model is a Convolutional Neural Network (CNN).

9. The non-transitory computer-readable media of claim 1, wherein the generative artificial intelligence model is an Encoder-Decoder model.

10. The non-transitory computer-readable media of claim 1, wherein the generative artificial intelligence model is a neural machine translation (NMT) model.

11. The non-transitory computer-readable media of claim 1, wherein the receiving, processing, and outputting is performed in real-time.

12. The non-transitory computer-readable media of claim 1, wherein the device is further caused to:

test the translation with real-world data, and update the generative artificial intelligence model based on a result of the testing.

13. The non-transitory computer-readable media of claim 12, wherein the real-world data includes feedback from a user regarding the translation.

14. The non-transitory computer-readable media of claim 13, wherein the generative artificial intelligence model is updated using reinforcement learning.

15. A method, comprising:

at a computer system:

receiving, via an application programming interface (API) enabling communications between an application and a language translation service, an input that includes:

audio of a speech that has been generated in a first spoken language by a chatbot process of the application, and an indication of a second spoken language to which the speech is to be translated;

processing the input, using a generative artificial intelligence model of the language translation service, to generate in real time a translation of the speech in the second spoken language; and outputting, by the language translation service to the application, an audio of the translation in the second spoken language to cause the chatbot process to operate as a multilingual chatbot that communicates in real time with a customer in the second spoken language.

16. A system, comprising:

a non-transitory memory storing instructions; and one or more processors in communication with the non-transitory memory that execute the instructions to:

receive, via an application programming interface (API) enabling communications between an application and a language translation service, an input that includes:

audio of a speech that has been generated in a first spoken language by a chatbot process of the application, and an indication of a second spoken language to which the speech is to be translated;

process the input, using a generative artificial intelligence model of the language translation service, to generate in real time a translation of the speech in the second spoken language; and output, by the language translation service to the application, an audio of the translation in the second spoken language to cause the chatbot process to operate as a multilingual chatbot that communicates in real time with a customer in the second spoken language.

\* \* \* \* \*